US005638313A

United States Patent [19]
Chu

[11] Patent Number: 5,638,313
[45] Date of Patent: Jun. 10, 1997

[54] BOOTH MULTIPLIER WITH HIGH SPEED OUTPUT CIRCUITRY

[75] Inventor: Tam-Anh Chu, Milpitas, Calif.

[73] Assignee: Cirrus Logic, Inc., Fremont, Calif.

[21] Appl. No.: 380,172

[22] Filed: Jan. 30, 1995

[51] Int. Cl.$^6$ .................................................. G06F 7/52
[52] U.S. Cl. ........................................................ 364/760
[58] Field of Search .............................. 364/760, 757, 364/788, 787

[56] References Cited

U.S. PATENT DOCUMENTS

| | | | |
|---|---|---|---|
| 4,573,137 | 2/1986 | Ohhashi | 364/788 |
| 4,575,812 | 3/1986 | Kloker et al. | 364/760 |
| 5,146,421 | 9/1992 | Adiletta et al. | 364/758 |
| 5,343,417 | 8/1994 | Flora | 364/758 |

FOREIGN PATENT DOCUMENTS 61-156433  7/1986  Japan .

OTHER PUBLICATIONS

Waser, "High–Speed Monolithic Multipliers for Real-Time Digital Signal Processing", IEEE 1978 pp. 19–29.

Primary Examiner—Tan V. Mai
Attorney, Agent, or Firm—Lowe, Price, LeBlanc & Becker; J. P. Violette

[57] ABSTRACT

A Booth multiplier for multiplying a first number with a second number to produce a product has an array of adder cells arranged in rows and produces addition results of bits from the first and second numbers. A carry lookahead circuit is coupled to a right side of the array to receive a portion of the addition results and produce the least significant bits of the product. A total delay through the carry lookahead circuit is equal to a total delay through the array of adder cells. A pipeline latch is provided for latching the least significant bits of the product and the addition results from a bottom row of the array of adder cells. An output adder receives the latched addition results of the adder cells of the bottom row and generates the most significant bits of the product. The output adder includes a carry lookahead adder that receives a first subset of the addition results from the adder cells of the bottom row, a first carry select adder that receives a second subset of the addition results from the adder cells of the bottom row, and a second carry select adder that receives a third subset of the bottom row of the addition results from the adder cells of the bottom row. Each of the carry lookahead adder, the first carry select adder and the second carry select adder produces a different subset of the most significant bits of the product.

12 Claims, 9 Drawing Sheets

| Figure 2A |
| Figure 2B |

BOOTH MULTIPLIER WITH HIGH SPEED OUTPUT CIRCUITRY

BACKGROUND OF THE INVENTION

1. Field of the Invention

The present invention relates to the field of math processors in computers, and more particularly, to Booth multipliers used in math processors to perform high speed multiplication of numbers.

2. Description of Related Art

One of the primary functions of most computer systems is to perform a large number of mathematical operations at a speed much faster than a human being could perform the operations. Since a computer devotes a considerable amount of its processing time to performing mathematical operations, an improvement in the speed of a math processor of the computer for performing a particular type of operation will increase the overall speed of the computer.

A known method of performing multiplication in a math processor is by array multiplication using a parallel multiplier. The parallel multiplication process is based on the fact that partial products in multiplication can be independently computed in parallel. An example of multiplication by partial products is shown below in Table 1 for two 4-bit numbers.

TABLE 1

| 4-bit Multiplier Partial Products | | | | | | | | |
|---|---|---|---|---|---|---|---|---|
| | | | | X3 | X2 | X1 | X0 | Multiplicand |
| | | | | Y3 | Y2 | Y1 | Y0 | Multiplier |
| | | | | X3Y0 | X2Y0 | X1Y0 | X0Y0 | |
| | | | X3Y1 | X2Y1 | X1Y1 | X0Y1 | | |
| | | X3Y2 | X2Y2 | X1Y2 | X0Y2 | | | |
| | X3Y3 | X2Y3 | X1Y3 | X0Y3 | | | | |
| P7 | P6 | P5 | P4 | P3 | P2 | P1 | P0 | Product |

A parallel multiplier is normally implemented as a square array of adders. In what is known as a Radix-2 scheme, the partial products are computed by observing one bit of the multiplier at a time. A higher radix multiplier, such as a Radix-4 multiplier, or a "Booth recoding multiplier", reduces the number of adders (and therefore the delay required to produce the partial sums) by examining a plurality of bits at a time. In conventional Booth recoding, the multiplier bits are divided into two-bit pairs, and a total of three bits are scanned at a time. These three bits are: the two bits from the present pair; and a third bit from the high order bit of an adjacent lower-order pair. After examining each triplet of bits, Booth recoding logic converts the triplet into a set of five signed digits 0, +1, +2, −1, and −2. Each recoded digit performs only a simplified processing on the multiplicand, such as add, subtract, or shift.

The speed of the Booth multiplier is limited by the number of rows of adders in the array. For example, a conventional 16×16 Booth multiplier such as shown in FIG. 1 will have an array containing eight rows of adders. There will therefore be a total delay of at least 8 adder delays (8Tadd, where Tadd is the delay of one adder) before the addition results of all of the adders are generated. This total delay of the array does not take into account, however, the further delays involved in adding together the final addition results (sum and carry) from the adders to generate the final product of the multiplication.

The addition results are normally added on the right-hand side of each row of the Booth multiplier by a plurality of two-bit adder circuits, and from the bottom row of adders by a carry select adder forming the output adder. A known Booth multiplier uses two 2-bit adders for each row (or "stage") of the array as shown in FIG. 1. These 2-bit adders are connected to the two right-most adders in a row and receive four bits which are added, with two bits of the final product and a carry out being produced by the adders. The two 2-bit adders for the eighth (and bottom) row of the array receive the addition results from the array after 8 adder delays (8Tadd). The carry-out from this final pair of 2-bit adders is provided after another adder delay to a carry-in input of the carry select adder. Thus, the carry select adder does not receive the carry-in until 9 adder delays (9Tadd) after the multiplier and the multiplicand entered the array.

A known 15-bit carry select adder is composed of a 3-bit carry lookahead adder for the 3 least significant bits, followed by three 4-bit carry select adders. The delay of the 15-bit carry select adder is equal to the delay from any input to the carry-out of the 3-bit carry lookahead adder (Tadd3) plus 3(Tmux), where Tmux is the delay from a select input to a multiplexer output of the three 4-bit carry select adders. If Tadd3 is equal to one of the adder delays of the array adders (Tadd3=Tadd), and Tmux=0.5Tadd, then the delay for the 15-bit carry select adder is 2.5 Tadd. Since the 15-bit carry select adder only receives the carry-in after 9 adder delays in the conventional design, the additional 2.5 adder delay introduced by the 15-bit carry select adder causes the total delay from the inputs of the multiplier and the multiplicand to the final product to be 11.5 adder delays (11.5 Tadd).

The savings of even one adder delay would provide a significant improvement in the speed of a multiplier. However, since a conventional array for multiplying 16-bit numbers will necessarily have eight rows of adders producing 8 adder delays, there is little room for improvement in the overall speed (11.5 adder delays) of the multiplier without increasing the speed of the individual adders of the array and the power consumption of the multiplier.

SUMMARY OF THE INVENTION

There is a need for a Booth multiplier with improved speed characteristics that is achieved without increasing the speed of the array adders or increasing the power consumption of the multiplier.

This and other needs are met by the present invention which provides a Booth multiplier for multiplying a first number with a second number to produce a product. The Booth multiplier has an array of adder cells arranged in rows and receiving the first number and Booth recoded bits of the second number and producing the final addition results. A multiple of 2-bit carry lookahead circuits are coupled to a right side of the array to receive a portion of the addition results and produce the least significant bits of the product. A total delay through the chain of 2-bit carry lookahead circuits is equal to a total delay through the array of adder cells. A pipeline latch is provided for latching the least significant bits of the product and the addition results from a bottom row of the array of adder cells. An output adder receives the latched addition results of the adder cells of the bottom row and generates the most significant bits of the product. The output adder includes a carry lookahead adder that receives a first subset of the addition results from the adder cells of the bottom row, a first carry select adder that receives a second subset of the addition results from the adder cells of the bottom row, and a second carry select adder that receives a third subset of the bottom row of the addition results from the adder cells of the bottom row. Each of the carry lookahead adder, the first carry select adder and the second carry select adder produces a different subset of the most significant bits of the product.

The present invention reduces the total delay of a Booth multiplier by a number of improvements. The carry lookahead circuit coupled to the right side of the array to produce the least significant bits of the product is made to have a total delay equal to a total delay through the array of adder cells. Furthermore, pipeline latches are positioned so that a delay for providing a carry-in to the output adder is equal to the total delay through the adder cells. The positioning of the pipeline in this manner requires a 17-bit output adder instead of a conventional 15-bit output adder. Although adding a larger number of bits, the 17-bit output adder of the present invention is implemented to have the same delay as the conventional 15-bit output adder. It does so by taking advantage of the fact that the inputs to the output adder do not arrive at the same time, but rather in two-bits or three-bits at a time, delayed by a duration equal to one stage of the array (one adder delay).

The foregoing and other objects, features, aspects and advantages of the present invention will become more apparent from the following detailed description of the present invention when taken in conjunction with the accompanying drawings.

DETAILED DESCRIPTION OF THE ILLUSTRATIVE EMBODIMENTS

Figures 1, 1A:
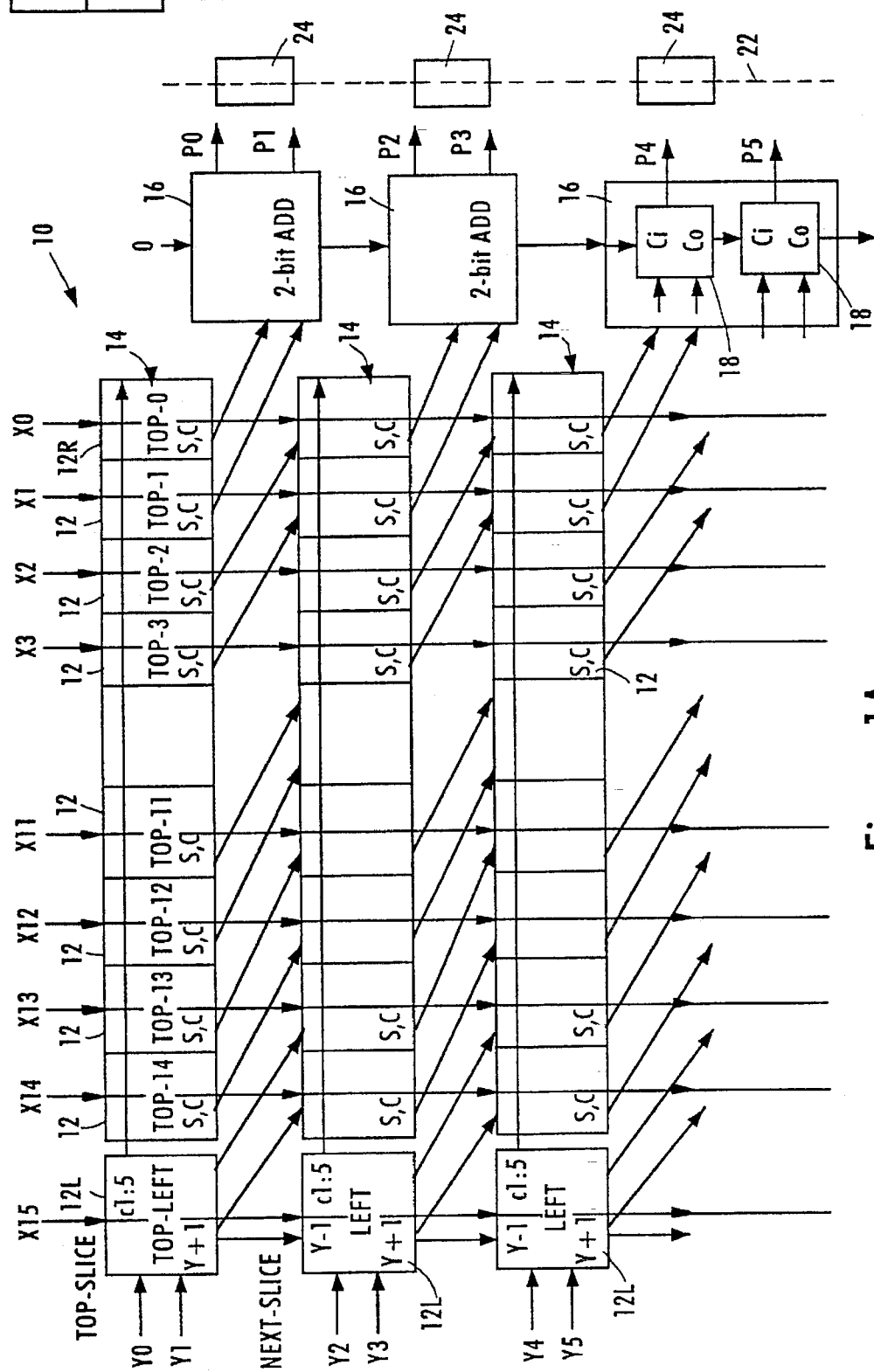
FIG. 1 is a block diagram of a prior art Booth multiplier.
Figure 1B:
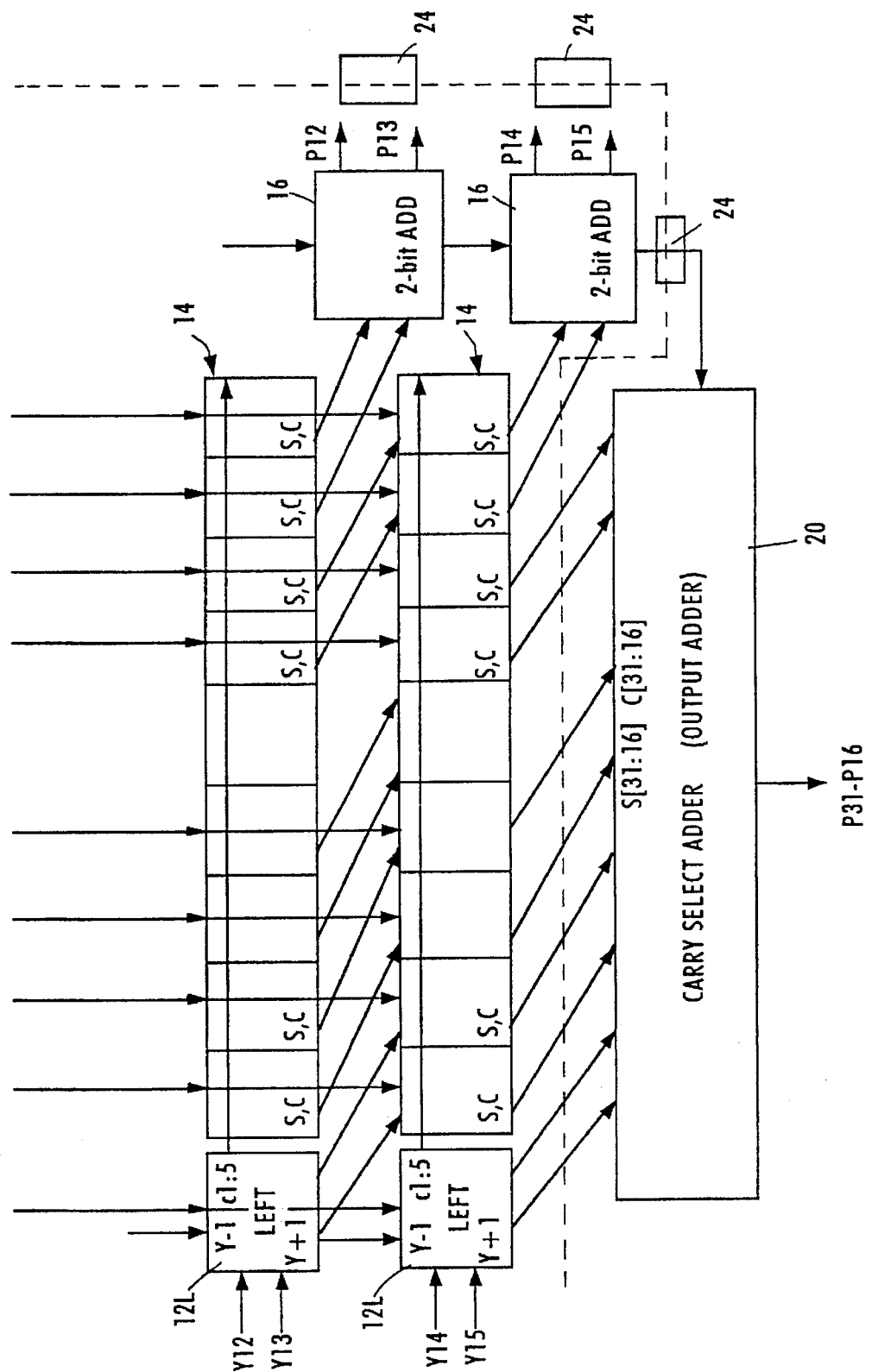

FIG. 1 is a block diagram of a prior art 16-bit Booth multiplier with an array of adder (or "core") cells 12 arranged in eight rows 14. Each row 14 has a left-most cell 12L and a right-most adder cell 12R.

The sixteen bits X0–X15 of the multiplicand are provided to each row 14 of adder cells 12. One bit is respectively provided to each of the adder cells 12 in a row 14.

The sixteen bits Y0–Y15 of the multiplier are divided into two-bit segments that are Booth recoded as signals c1:5 for each of the individual rows 14. Each of the left-most cells 12L includes Booth recoding logic to recode the bits of the multiplier into Booth recoded signals as well as adder circuitry. The top left-most cell 12L therefore receives as inputs bit X15 of the multiplicand and the Booth recoded signals c1:5 representing bits Y0 and Y1 of the multiplier. The recoded signals c1:5 for bits Y0 and Y1 are also provided to each of the other adder cells 12 in the top row 14 of the array 10. The other left-most cells 12L in the array 10 receive, in addition to the respective $Y_N$ and $Y_{N+1}$ bits, the $Y_{N-1}$ bit from the previous row 14.

The individual adder cells 12 perform the appropriate action on the $X_N$ bit (shift, add, subtract) according to the Booth recoded signals c1:5, and the sum and carry results (hereafter termed "the addition results") are passed diagonally to an adder cell 12 in the next row 14 as indicated by the arrows.

A 2-bit adder circuit 16 is coupled to receive the addition results from the two right-most adder cells 12 of each row 14. Additionally, the carry-out of a 2-bit adder circuit 16 of one row 14 forms the carry-in of the 2-bit adder circuit of the next lower row 14. Each 2-bit adder circuit 16 comprises two 2-bit adders 18. Only one of the 2-bit adder circuits 16 is shown in this manner in FIG. 1 for illustration purposes, but the remainder are similarly constructed. Two bits ($P_N$, $P_{N+1}$) of the final product P are generated by each 2-bit adder circuit 16, in addition to a carry-out. The 2-bit adder circuits 16 produce the sixteen (15:0) least significant bits of the final product P.

There are 8 adder delays for the addition results to propagate through the array 10 out of the bottom row 14. In this conventional arrangement, each adder delay is approximately 2 nanoseconds (ns), so that the total delay through the array is 16 ns. The delay from carry-in to carry-out of each of the 2-bit adders 18 is approximately 1.5 ns. Since there are sixteen 2-bit adders 18 in the chain, there is a total chain delay of 24 ns before the last carry-out from the bottom 2-bit adder circuit 16 is available. The total chain delay is therefore equal to 12 adder delays.

The addition results of the bottom row 14 of the array 10 are received by a carry select adder 20, which also receives as a carry-in the carry-out of the bottom 2-bit adder circuit 16 after 12 adder delays. The carry select adder 20 is operative with a 2.5 adder delay (approximately 5 ns), and produces the sixteen (31:16) most significant bits of the final product P. The total delay from the entry of X and Y into the multiplier to the final product P is therefore equal to 12+2.5= 14.5 adder delays (29 ns).

The Booth multiplier of the prior art is pipelined using latches. A pipeline boundary 22 along which pipeline latches 24 are placed is schematically illustrated. For pitch-matching and layout reasons, the pipeline latches 24 are placed after the last 2-bit adder circuit 16 that generates bits (15:14) of the final product P. The carry-out from this bottom 2-bit adder circuit 16 is also pipelined and forwarded to the carry select adder 20.

Figures 2, 2A:
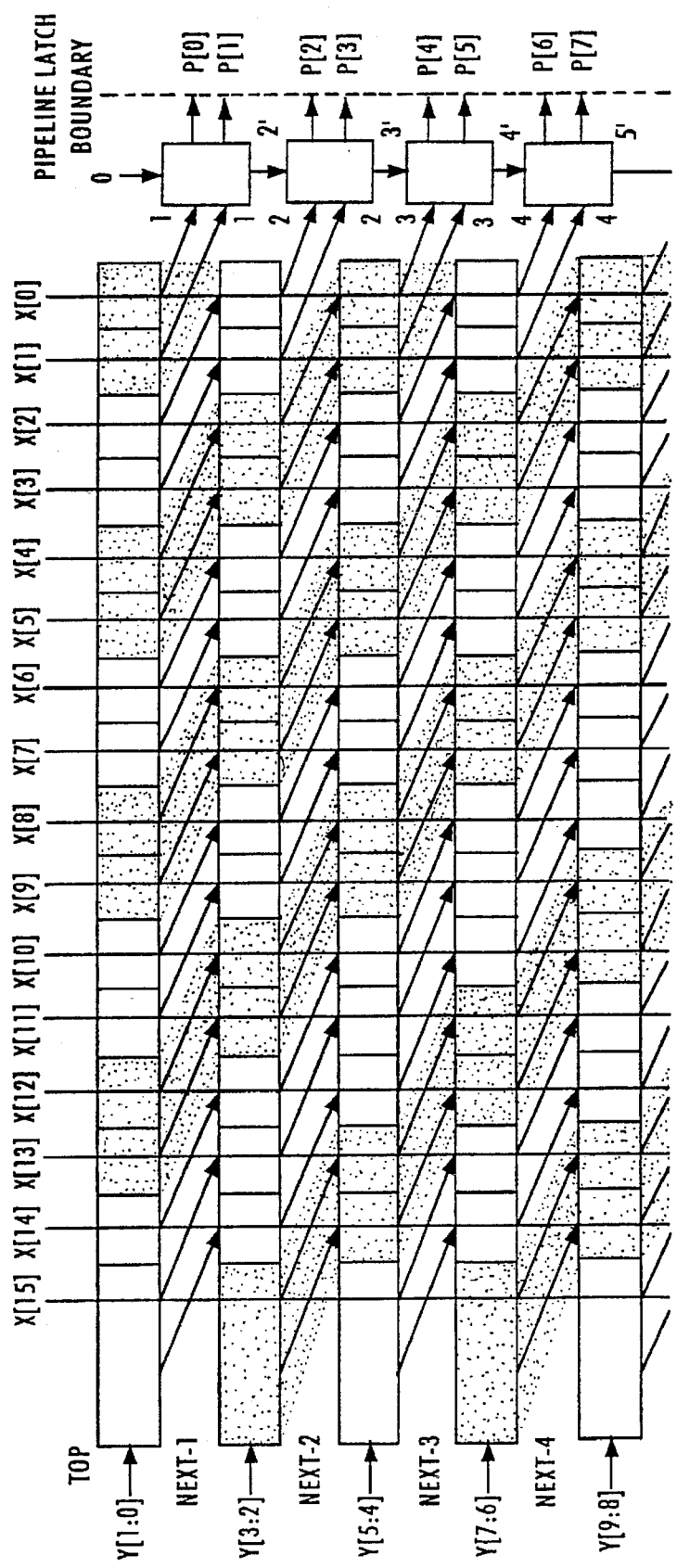
FIG. 2 is a delay analysis of an idealized prior art Booth multiplier.
Figure 2B:
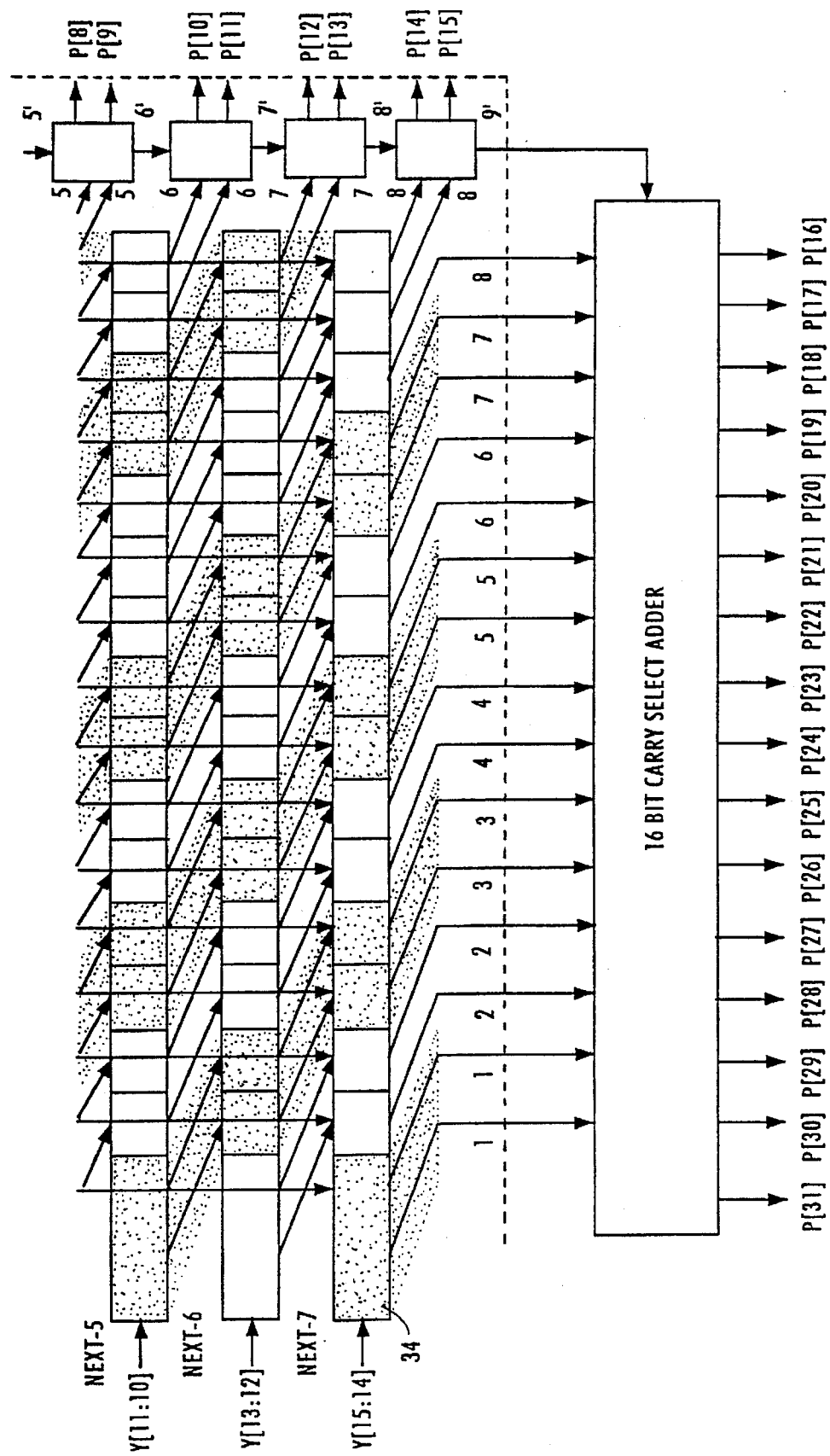

A delay analysis of the conventional Booth multiplier is illustrated with the help of FIG. 2. The numbers (1–8) at the outputs of the array represent the delay times after the receipt of the X,Y inputs when the outputs are available. For example, the addition results from the left-most cell 12L of the bottom row of the array are available 1 adder delay after the X,Y inputs entered the array.

It is important to note for this delay analysis, however, that the delays of the 2-bit adder circuits have been idealized to be equal to 1 adder delay instead of 1.5 adder delays. Even when the 2-bit adder circuits have been idealized in this manner, which can be done according to the present invention as will be explained later, the total chain delay is equal to 9 adder delays. The carry-out of the last adder is then provided as a carry in to the output adder, which produces the most significant bits of the product P after an additional 2.5 adder delays. The total delay to produce the final product is therefore equal to 9+2.5=11.5 adder delays.

Figure 3A:
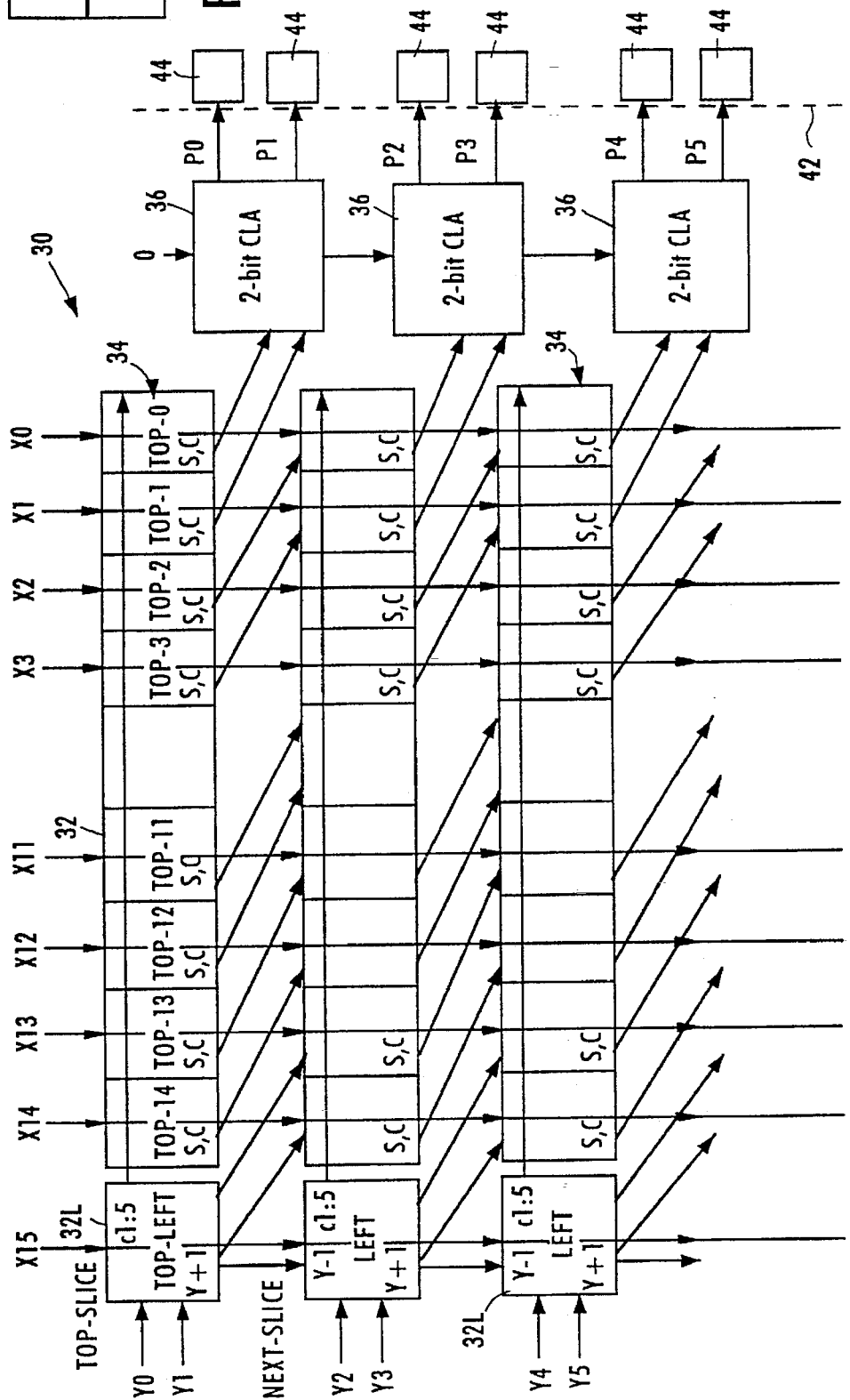
FIG. 3 is a block diagram of a Booth multiplier constructed in accordance with an embodiment of the present invention.
Figure 3B:
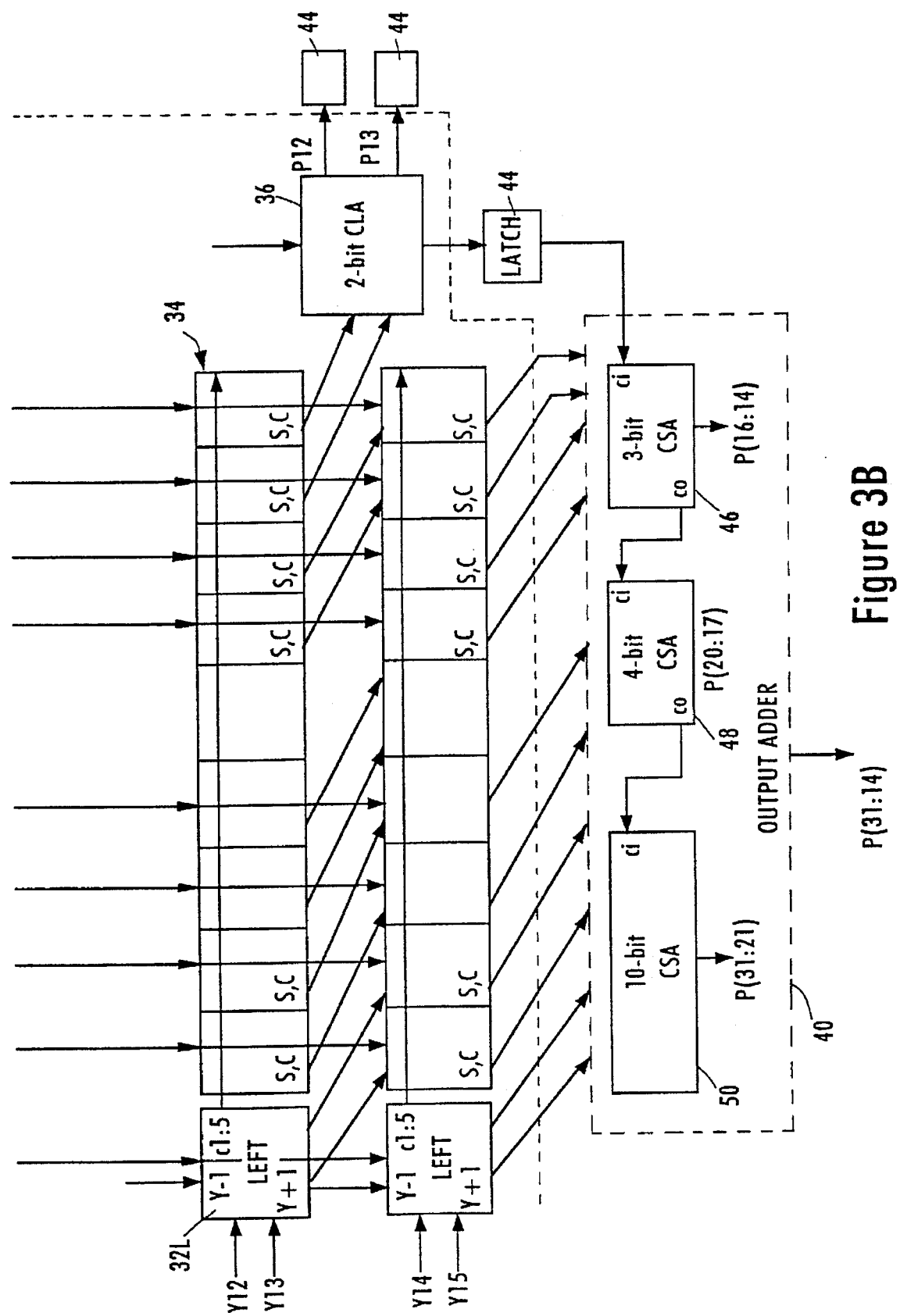

The present invention significantly reduces the total multiplier delay from both the conventional prior art Booth multiplier (14.5 adder delays) and the idealized example of a Booth multiplier (11.5 adder delays). FIG. 3 is a block diagram of a Booth multiplier constructed according to an exemplary embodiment of the present invention. The 16×16 Booth multiplier of FIG. 3 has a conventional array 30 of adder cells 32 arranged in eight rows 34. This array 30 provides the addition results in the same manner and with the same adder delays as in the prior art. The present invention reduces the total delay of a Booth multiplier by improving the delays of the output circuits of the multiplier.

The total chain delay in the prior art multiplier due to the 2-bit adder circuits on the right side of the array 10 was 12 adder delays, since each 2-bit adder circuit used two 2-bit adders with a 1.5 adder delay. In order to provide optimum speed, however, the delay of each 2-bit adder 36 should be equal to the adder delay (1 adder delay) of an adder cell 32 in the array 30. A 2-bit adder 36 that performs with this delay requirement is a 2-bit carry lookahead adder. Accordingly, in the exemplary embodiment, each of the 2-bit adder circuits 36 in the Booth multiplier of the present invention is a 2-bit carry lookahead adder. A conventional implementation of a 2-bit carry lookahead adder can be used that will satisfy the delay requirements, and is therefore not illustrated in detail.

In the exemplary embodiment of FIG. 3, seven 2-bit carry lookahead adders 36 are provided. These adders 36 are respectively coupled to the two right-most adder cells 32 of the top seven rows 34 of the array 30. Since each 2-bit carry lookahead adder 36 operates with only 1 adder delay, the bottom adder 36 provides its carry-out signal 8 adder delays after X and Y have entered the array 30. This can be seen in the delay analysis representation in FIG. 4 of the Booth multiplier of FIG. 3.

The present invention also increases the speed (i.e., reduces the delay) of the multiplier by the repositioning of the pipeline latches in comparison to conventional designs. In the present invention, as depicted in FIG. 3, pipeline latches 44 are positioned after the bottom 2-bit carry lookahead adder 36, which generates bits (13:12) of the final product P. This achieves an optimal total chain delay before the carry-out is generated to the output adder of eight adder delays. The trade-off for this repositioning of the pipeline latches 44 is that the output adder 40 is required to perform a 17-bit instead of a 15-bit addition.

A 17-bit output adder 40 constructed according to an exemplary embodiment of the present invention includes a 3-bit carry lookahead adder 46, a 4-bit carry select adder 48, and a 10-bit carry select adder 50. The carry-out of the 3-bit carry lookahead adder 46 is coupled to the carry-in of the 4-bit carry select adder 48, and the carry-out of the 4-bit carry select adder 48 is coupled to the carry-in of the 10-bit carry select adder 50. The output adder 40 is coupled to the bottom row 34 of the array 30. In the conventional multiplier, the output adder was not coupled to the two right-most adder cells of the bottom row. However, in the present invention, the output adder 40 is coupled to each of the adder cells 32 of the bottom row 34.

In the exemplary embodiment of the present invention, the most significant 18 bits (31:0) of the final product P are generated by the output adder 40, while the least significant 14 bits (13:0) of the final product P are generated by the 2-bit carry lookahead adders 36.

Figure 6:
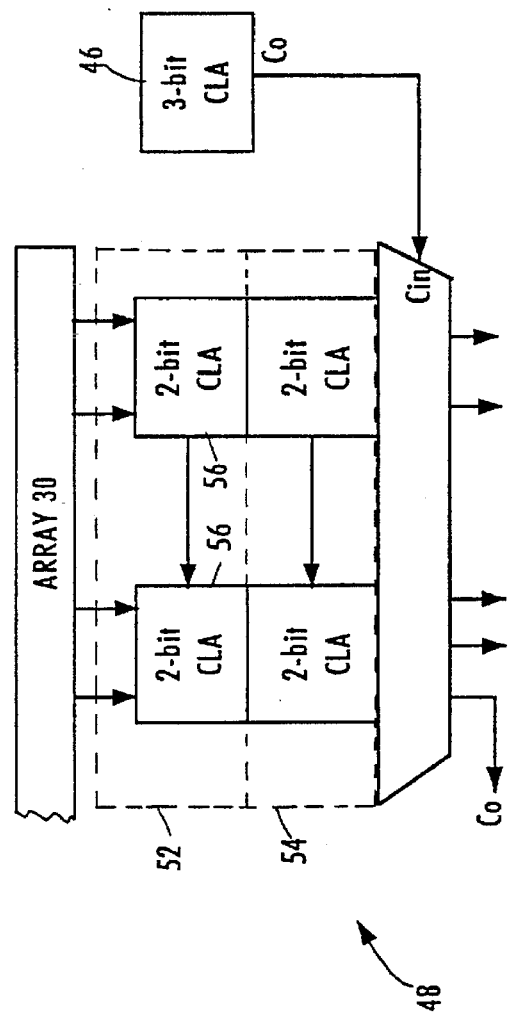
FIG. 6 is a block diagram of a carry select adder constructed in accordance with an embodiment of the present invention.

A block diagram of an exemplary embodiment of the 4-bit carry select adder 48 is provided in FIG. 6. The carry select adder 48 has two 4-bit adders 52, 54 that are each made from two 2-bit carry lookahead adders 56 such as the 2-bit carry lookahead adders 36. Each of the 2-bit carry lookahead adders 56 has a delay equal to one adder delay. The 10-bit carry select adder 50 is similarly constructed as the 4-bit carry select adder 48, but with five 4-bit adders.

Figure 4A:
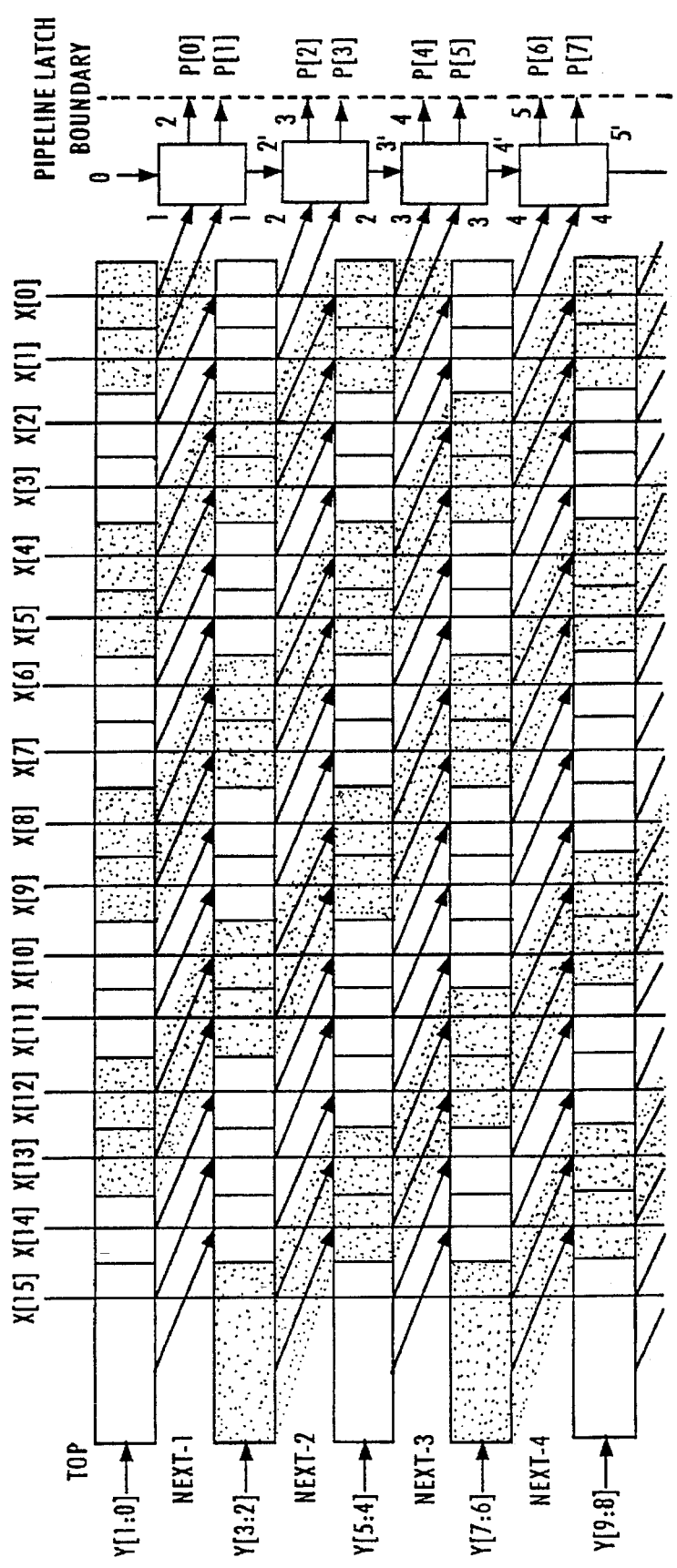
FIG. 4 is a delay analysis of the Booth multiplier of FIG. 3.
Figure 4B:
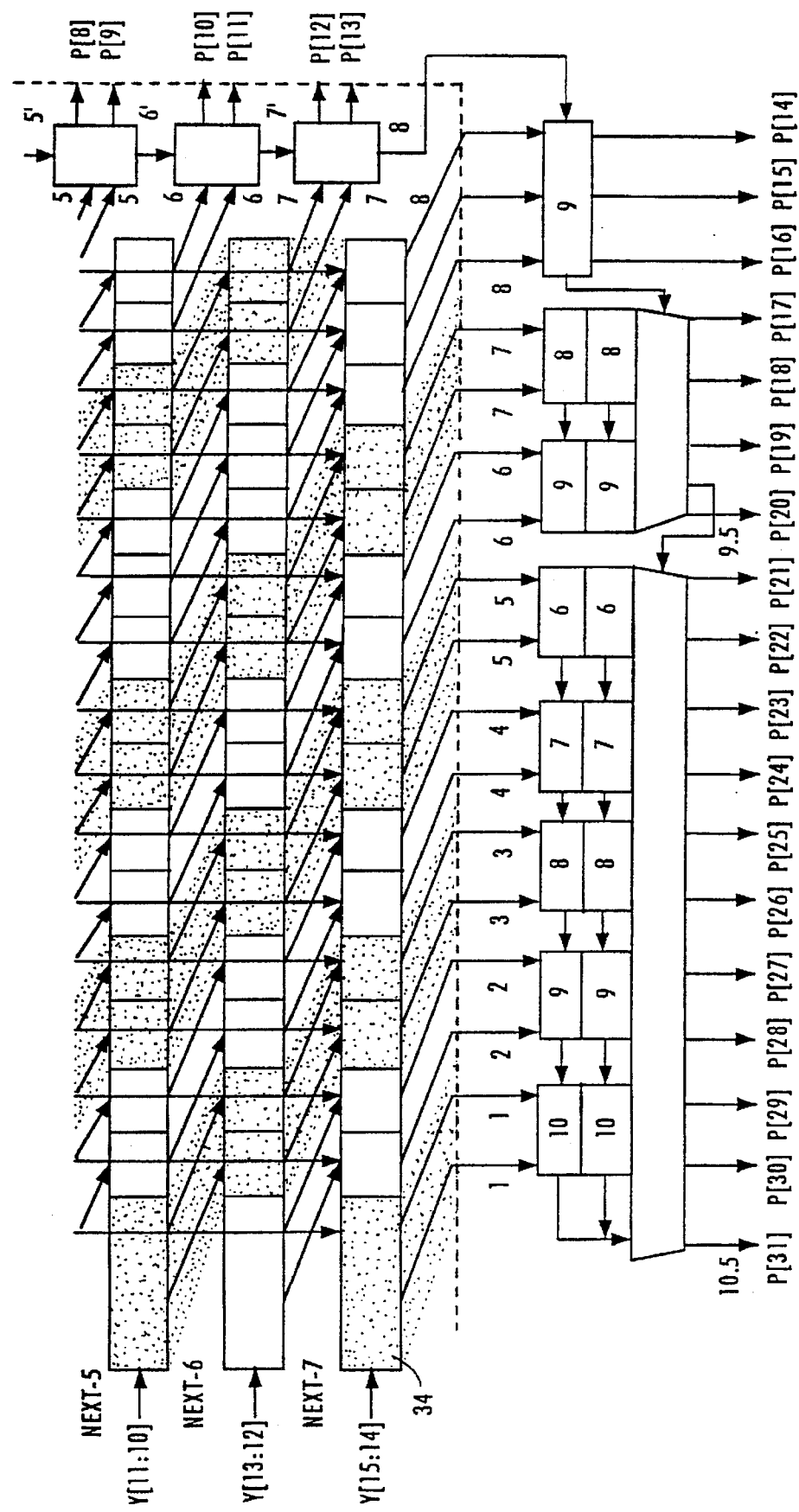

In order to understand the advantages of the output adder of the present invention, reference should now be made to the delay analysis representation of FIG. 4. The delay of the 17-bit output adder 40 of the present invention is optimized by the recognition that the inputs (the addition results from the array 30) to the output adder 40 do not arrive at the same time. Rather, the addition results arrive two or three bits at a time, delayed by a duration equal to one stage (row 34) of the array 30. The arrival times of the outputs of the bottom row 34 are indicated in FIG. 4, where 1 represents 1 adder delay, 2 represents 2 adder delays, etc. Time 0 is the arrival time of input numbers X and Y at the multiplier.

As can be seen by this representation, the inputs to the 4-bit carry select adder 48 arrive at 6 and 7 adder delays. The 4-bit carry select adder generates the carry-out at 9 adder delays. There is a multiplexer delay of 0.5 adder delays, so that the 10-bit carry select adder 50 receives the carry-out as a carry-in at 9.5 adder delays. Similarly, the 10-bit carry select adder 50 generates its carry-out at 10 adder delays, and the multiplexer provides the final product after an additional 0.5 adder delay. The total delay of the 17-bit output adder 40 is 2.5 adder delays, the same as the 15-bit output adder of the conventional design.

The total delay from the input of the numbers X and Y to the final product P in the present invention is 10.5 adder delays, an improvement by 4 adder delays over the conventional design, and an improvement of 1 adder delay over an idealized version of the conventional design.

Figure 5:
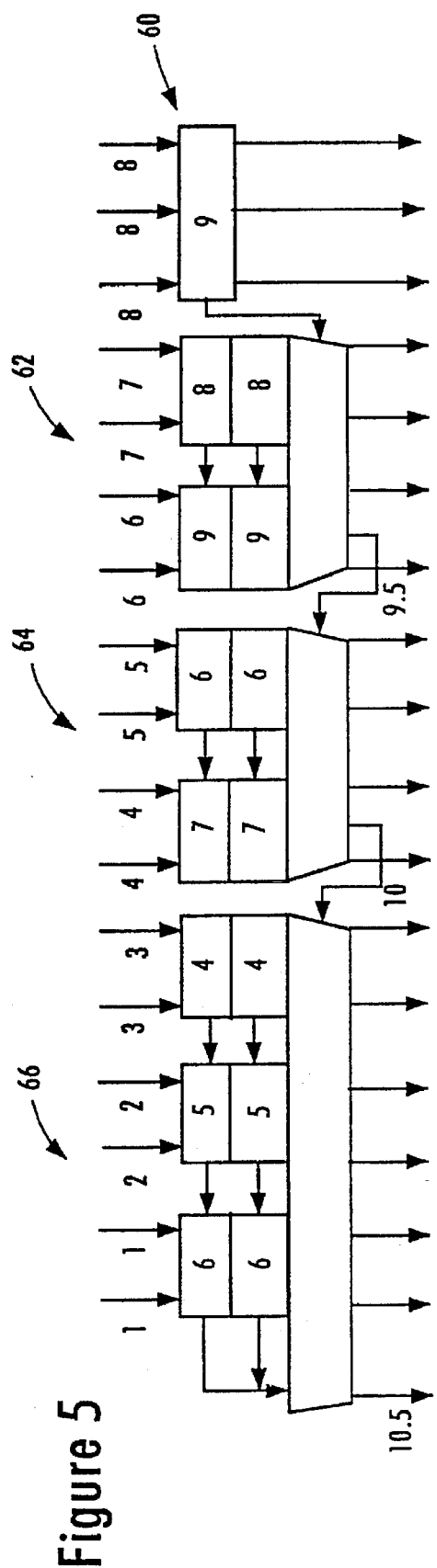
FIG. 5 is a block diagram of an alternative embodiment of an output adder in accordance with the present invention.

An alternative embodiment of the 17-bit output adder 40 is shown in a delay analysis representation in FIG. 5. This embodiment includes a 3-bit carry lookahead adder 60, a first 4-bit carry select adder 62, a second 4-bit carry select adder 64, and a 6-bit carry select adder 66. Each of the carry select adders 62–66 is constructed similarly to the 4-bit carry select adder 48 shown in FIG. 6. The delay analysis representation of this alternative embodiment of the output adder 40 makes it apparent that the total delay of the multiplier when using this alternative output adder 40 will also be 10.5 adder delays, as in the embodiment of FIG. 3.

The use of a two bit carry lookahead circuit on the right side of the array, the repositioning of the pipeline latches, and the optimization of a 17-bit output adder according to the present invention provides a reduction in the total delay of a Booth multiplier, without increasing the speed of the array or power consumption.

Although the present invention has been described and illustrated in detail, it is clearly understood that the same is by way of illustration and example only and is not to be taken by way of limitation, the spirit and scope of the present being limited only by the terms of the appended claims.

I claim:

1. A Booth multiplier for multiplying a first number with a second number to produce a product, comprising:

an array of adder cells arranged in N rows of adder cells, the adder cells performing addition on bits of the first and second numbers, one of the adder cells of each row being a left-most cell for that row, and two of the adder cells of each row being two rightmost adder cells for that row, each row of adder cells receiving Booth recoded bits of a different subset of bits of the second number, each of the adder cells in each row receiving a different bit of the first number;

an array of N-1 carry look ahead adders, each carry look ahead adder coupled to the two right-most adder cells of a different one of the rows to receive addition results from the two right-most adder cells for that row and performing a carry look ahead addition on the addition results to produce at least one bit of the product, each of said carry look-ahead adders being coupled to a row in said array of adder cells except for the bottom row;

each of said adder cells having the same adder delay; and each of said carry look-ahead adders having a delay equal to the adder cell delay.

2. The Booth multiplier of claim 1, wherein each carry lookahead adder is a two-bit carry lookahead adder.

3. A Booth multiplier for multiplying a first number with a second number to produce a product, comprising:

an array of adder cells arranged in N rows of adder cells, one of the rows in the array being a top row, and another of the rows in the array being a bottom row, the adder cells performing addition on bits of the first and second numbers, one of the adder cells of each row being a left-most cell for that row, and two of the adder cells of each row being two right-most adder cells for that row, each row of adder cells receiving Booth recoded bits of a different subset of bits of the second number, each of the adder cells in each row also receiving a different bit of the first number;

an array of N-1 carry look ahead adders, each carry look ahead adder coupled to the two right-most adder cells of a different one of the rows to receive addition results from the two right-most adder cells for that row and performing an addition on the addition results to produce at least one bit of the product, each of said carry look-ahead adders being coupled to a row in said array of adder cells except for the bottom row:

each of said adder cells having the same adder delay; and each of said carry look-ahead adders having a delay equal to the adder cell delay;

an output adder coupled to the adder cells of the bottom row to perform addition on the addition results to produce bits of the product; and a pipeline latch coupled to the plurality of adders that latches the bits of the product produced by said carry look ahead adders coupled to the rows of the array except for the bottom row of the array, said pipelined latch being coupled between the adder cells of the bottom row and the output adder to provide latched addition results of the bottom row of adder cells to the output adder.

4. The Booth multiplier of claim 3, wherein one of the rows is a next most bottom row and the adder coupled to the next most bottom row produces a carry out, and wherein the pipeline latch is additionally coupled to latch said carry out and produce a latched carry out to the output adder.

5. The Booth multiplier of claim 4, wherein the number of bits in each of the first and second numbers is 16, and the number of rows in the array is 8.

6. A Booth multiplier for multiplying a first number with a second number to produce a product, comprising:

an array of adder cells arranged in N rows of adder cells, one of the rows in the array being a top row, and another of the rows in the array being a bottom row, the adder cells performing addition on bits of the first and second numbers, one of the adder cells of each row being a left-most cell for that row, and two of the adder cells of each row being two right-most adder cells for that row, each row of adder cells receiving Booth recoded bits of a different subset of bits of the second number, each of the adder cells in each row also receiving a different bit of the first number;

an array of N-1 carry look ahead adders, each carry look ahead adder coupled to the two right-most adder cells of a (different one of the rows to receive addition results from the two right-most adder cells for that row and performing a carry look ahead addition on the addition results to produce at least one bit of the product, each of said carry look-ahead adders being coupled to a row in said array of adder cells except for the bottom row;

each of said adder cells having the same adder delay;

each of said carry look-ahead adders having a delay equal to the adder cell delay; and an output adder that receives the addition results of the adder cells of the bottom row and generates the most significant bits of the product, the output adder including a carry look ahead adder that receives a first subset of the addition results from the adder cells of the bottom row, a first carry select adder that receives a second subset of the addition results from the adder cells of the bottom row, and a second carry select adder that receives a third subset of the bottom row of the addition results from the adder cells of the bottom row, each of the carry look ahead adder, the first carry select adder and the second carry select adder producing a different subset of the most significant bits of the product.

7. The Booth multiplier of claim 6, wherein the carry lookahead adder has a carry out, the first carry select adder has a carry out and a carry in coupled to the carry out of the carry lookahead adder, and the second carry select adder has a carry in coupled to the carry out of the first carry select adder.

8. The Booth multiplier of claim 7, wherein the carry lookahead adder is a three-bit carry lookahead adder, the first carry select adder is a four-bit carry select adder, and the second carry select adder is a ten-bit carry select adder.

9. The Booth multiplier of claim 7, wherein the output adder further includes a third carry select adder that receives a fourth subset of the addition results from the adder cells of the bottom row and produces a different subset of the most significant bits of the product than the different subsets produced by the carry lookahead adder and the first and second carry select adders, the second carry select adder having a carry out and the third carry select adder having a carry in coupled to the carry out of the second carry select adder.

10. The Booth multiplier of claim 9, wherein the carry lookahead adder is a three-bit carry lookahead adder, the first carry select adder is a four-bit carry select adder, the second carry select adder is a four-bit carry select adder, and the third carry select adder is a six-bit carry select adder.

11. Booth multiplier for multiplying a first number with a second number to produce a product, comprising:

an array of adder cells arranged in N rows of adder cells, one of the rows in the array being a top row, and another of the rows in the array being a bottom row, the adder cells performing addition on bits of the first and second numbers, one of the adder cells of each row being a left-most cell for that row, and two of the adder cells of each row being two right-most adder cells for that row, each row of adder cells receiving Booth recoded bits of a different subset of bits of the second number, each of the adder cells in each row also receiving a different bit of the first number;

an array of N-1 carry look ahead adders, each carry look ahead adder coupled to the two right-most adder cells of a different one of the rows to receive addition results from the two right-most adder cells for that row and performing a carry look ahead addition on the addition results to produce at least one bit of the product, said carry look-ahead adders being coupled to every row in said array of adder cells except for the bottom row;

a pipeline latch coupled to the plurality of adders that latches the bits of the product produced by those adders coupled to the rows of the array except for the bottom row of the array; and an output adder that receives the latched addition results of the adder cells of the bottom row from the pipeline latch and generates the most significant bits of the product, the output adder including a carry look ahead adder that receives a first subset of the addition results from the adder cells of the bottom row, a first carry select adder that receives a second subset of the addition results from the adder cells of bottom row, and a second carry select adder that receives a third subset of the bottom row of the addition results from the adder cells of the bottom row, each of the carry look ahead adder, the first carry select adder and the second carry select adder producing a different subset of the most significant bits of the product.

12. A Booth multiplier for multiplying a first number with a second number to produce a product, comprising:

an array of adder cells arranged in N rows and receiving the first number and Booth recoded bits of the second number and producing addition results;

an array of N-1 carry look ahead circuits coupled to a right side of the array to receive a portion of the addition results and producing the least significant bits of the product, a total delay through the carry look ahead circuit being equal to a total delay through the array of adder cells, said carry look ahead circuits includes a carry look ahead adder for each row except a bottom row of the array;

a pipeline latch for latching the least significant bits of the product and the addition results from a bottom row of the array of adder cells; and an output adder that receives the latched addition results of the adder cells of the bottom row and generates the most significant bits of the product, the output adder including a carry look ahead adder that receives a first subset of the addition results from the adder cells of the bottom row, a first carry select adder that receives a second subset of the addition results from the adder cells of the bottom row, and a second carry select adder that receives a third subset of the bottom row of the addition results from the adder cells of the bottom row, each of the carry look ahead adder, the first carry select adder and the second carry select adder producing a different subset of the most significant bits of the product.

* * * * *